US010036491B2

United States Patent
Harris et al.

(10) Patent No.: US 10,036,491 B2
(45) Date of Patent: *Jul. 31, 2018

(54) LOW-PERMEATION FLEXIBLE FUEL HOSE

(71) Applicant: Gates Corporation, Denver, CO (US)

(72) Inventors: Earl Harris, Murfreesboro, TN (US); Lance D. Miller, Uniontown, OH (US); Dana S. Stripe, Henryville, IN (US)

(73) Assignee: Gates Corporation, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,996

(22) Filed: Feb. 8, 2017

(65) Prior Publication Data

US 2017/0146158 A1 May 25, 2017

Related U.S. Application Data

(63) Continuation of application No. 13/116,879, filed on May 26, 2011, now Pat. No. 9,592,648, which is a
(Continued)

(51) Int. Cl.
*B32B 1/08* (2006.01)
*B32B 25/08* (2006.01)
(Continued)

(52) U.S. Cl.
CPC .............. *F16L 11/085* (2013.01); *B32B 1/08* (2013.01); *B32B 5/02* (2013.01); *B32B 5/022* (2013.01);
(Continued)

(58) Field of Classification Search
CPC .......... Y10T 428/1352; Y10T 428/139; Y10T 428/1393; F16L 11/00; F16L 11/08;
(Continued)

(56) References Cited

U.S. PATENT DOCUMENTS 6,386,239 B1 * 5/2002 Ramey ...................... B32B 1/08
138/125
6,435,217 B1 * 8/2002 Bertero ...................... F16L 9/12
138/126
(Continued)

FOREIGN PATENT DOCUMENTS

JP H05331344 A 12/1993
JP 2009154467 A 7/2009

OTHER PUBLICATIONS

Intellectual Property India, Government of India, Controller of Patents, Examination Report under sections 12 & 13 of the Patents Act, application No. 11399/DELNP/2012, dated May 4, 2018.

*Primary Examiner* — Lee E Sanderson
(74) *Attorney, Agent, or Firm* — Paul N. Dunlap, Esq.; Jeffrey A. Thurnau, Esq.

(57) ABSTRACT

A flexible hose or a tubing having a barrier layer of polyamide 6 having an impact modifier, and/or branched molecular structure, a flexural modulus of 1 to 2 GPa and/or a tensile elongation of 100% or more. The hose may have additional layers such as an HNBR rubber inner tube, an EVM/CPE rubber blend outer cover, a textile or wire reinforcement, or the like. Permeability to ethanol- and methanol-containing fuels is very low. Permeability to B20 biofuels is very low.

10 Claims, 2 Drawing Sheets

Related U.S. Application Data continuation-in-part of application No. 12/791,654, filed on Jun. 1, 2010, now abandoned.

(60) Provisional application No. 61/352,822, filed on Jun. 8, 2010, provisional application No. 61/296,784, filed on Jan. 20, 2010, provisional application No. 61/183,030, filed on Jun. 1, 2009.

(51) Int. Cl.

| | |
|---|---|
| *F16L 11/08* | (2006.01) |
| *F02M 37/00* | (2006.01) |
| *B32B 25/10* | (2006.01) |
| *B32B 25/14* | (2006.01) |
| *B32B 27/12* | (2006.01) |
| *B32B 27/34* | (2006.01) |
| *B32B 5/02* | (2006.01) |
| *B32B 7/12* | (2006.01) |
| *B32B 25/16* | (2006.01) |
| *F16L 11/04* | (2006.01) |

(52) U.S. Cl.
CPC ............ *B32B 5/024* (2013.01); *B32B 5/026* (2013.01); *B32B 7/12* (2013.01); *B32B 25/08* (2013.01); *B32B 25/10* (2013.01); *B32B 25/14* (2013.01); *B32B 25/16* (2013.01); *B32B 27/12* (2013.01); *B32B 27/34* (2013.01); *F02M 37/0017* (2013.01); *F16L 11/081* (2013.01); *B32B 2250/24* (2013.01); *B32B 2262/0223* (2013.01); *B32B 2262/0261* (2013.01); *B32B 2262/0269* (2013.01); *B32B 2262/0276* (2013.01); *B32B 2262/103* (2013.01); *B32B 2264/105* (2013.01); *B32B 2270/00* (2013.01); *B32B 2307/304* (2013.01); *B32B 2307/54* (2013.01); *B32B 2307/546* (2013.01); *B32B 2307/704* (2013.01); *B32B 2307/726* (2013.01); *B32B 2307/7265* (2013.01); *B32B 2307/732* (2013.01); *B32B 2597/00* (2013.01); *F16L 2011/047* (2013.01)

(58) Field of Classification Search
CPC ...... F16L 2011/047; B32B 1/08; B32B 25/08; B32B 25/10; B32B 25/14; B32B 25/16; B32B 5/02; B32B 5/022; B32B 5/024; B32B 5/026; B32B 2597/00
USPC .................................. 428/36.8, 36.9, 36.91
See application file for complete search history.

(56) References Cited

U.S. PATENT DOCUMENTS

| | | | | |
|---|---|---|---|---|
| 2007/0036998 | A1* | 2/2007 | Dowe | B29C 47/0004 428/474.4 |
| 2009/0082512 | A1* | 3/2009 | Koyashiki | B60K 15/03177 524/442 |

* cited by examiner

US 10,036,491 B2

LOW-PERMEATION FLEXIBLE FUEL HOSE

CROSS REFERENCE TO RELATED APPLICATIONS

This application is a continuation of U.S. application Ser. No. 13/116,879, which claims the benefit of U.S. Provisional Application Ser. No. 61/352,822 filed Jun. 8, 2010, and which also is a continuation-in-part of U.S. application Ser. No. 12/791,654 filed on Jun. 1, 2010, which claims the benefit of U.S. Provisional Application Ser. No. 61/296,784 filed on Jan. 20, 2010, and the benefit of U.S. Provisional Application Ser. No. 61/183,030 filed on Jun. 1, 2009.

BACKGROUND OF THE INVENTION

Field of the Invention

This invention relates generally to a flexible fuel hose with low permeability to fuels, and more particularly to a hose with a barrier layer of a particular type of polyamide 6.

Description of the Prior Art

The increased used of motor-vehicle fuels containing alcohol, including ethanol, along with stringent emissions standards for fuel system components has necessitated improvement over conventional flexible hose constructions. Conventional fuel hose constructions used economical, fuel-resistant rubber materials such as nitrile rubber (NBR), nitrile-polyvinyl chloride blends (NBR-PVC), epichlorohydrin (ECO), and the like. Improved hose for alcohol-containing fuels now generally use one or more of various fluoroelastomers and/or fluoroplastics such as those commonly designated as FKM, PVDF, ETFE, FEP, EFEP, PCTFE, THV, PTFE, and the like (hereinafter referred to generally as fluoropolymers) to provide a barrier to alcohol and fuel permeation. The typical preferred material for a fuel hose barrier layer is a fluoropolymer film such as THV (a terpolymer of tetrafluoroethylene, hexafluoropropylene, and vinylidene fluoride) an example of which is disclosed in U.S. Pat. No. 5,679,425.

While fluoropolymer barrier hose has dominated the fuel hose market, many other materials are available as potential barrier layers. U.S. Pat. No. 6,945,279, which is directed to a method of making rubber hoses with an intermediate thermoplastic layer by rolling a planar resin film into a cylindrical layer with an overlap, discloses extensive lists of potential rubber materials and thermoplastic resin materials. While NBR is mentioned on the list of potential rubber materials and polyamide 6 ("PA 6") as a potential resin film, U.S. Pat. No. 6,945,279 offers no particular guidance for selecting materials for any particular use, and no working examples are disclosed therein. Typical fuel hoses have further included multi-layer barrier constructions which combine fluoropolymers with other materials including for example polyamides. Frequently polyamides are cited as useful materials for thermoplastic multilayer tubing for fuels.

An example of use of a thermoplastic film layer of nylon 11 (i.e., polyamide 11) in fuel hose is provided by U.S. Pat. No. 6,279,615, wherein the polyamide ("PA") is the innermost veneer layer on the inner surface of the rubber hose of a comparative example. Regardless, the permeation rates obtained for the hose described in U.S. Pat. No. 6,279,615 were not low enough to meet current SAE (Society of Automotive Engineers) standards. U.S. Pat. No. 2,564,602 discloses a rubber hose with an intermediate layer of flexible, resinous, thermoplastic material including nylon. U.S. Pat. Pub. No. 2007/194481A1 discloses a rubber hose with inner tube and outer cover of rubber and an intermediate barrier resin layer of any kind of thermoplastic resin including PA 6, but preferably of fluoropolymer for fuel hose applications, wherein the resin layer is plasma treated. U.S. Pat. No. 7,478,653 discloses a 4-layer rubber fuel hose with a barrier layer of fluoropolymer or polyamide (including PA 6).

U.S. Pat. No. 6,855,787 discloses thermoplastic fuel transfer tubes based on polyamide resin, such as PA 6, containing a barrier layer of fluoropolymer. U.S. Pat. No. 6,491,994 discloses a thermoplastic fuel transfer tube based on layers of PA 11 or PA 12 resin, PA 6, and PA 6 with a layered silicate dispersed therein. U.S. Pat. No. 7,011,114 discloses a thermoplastic fuel transfer tube based on polyamide resin containing a barrier layer of polyphenylene sulfide ("PPS").

An example of use of a multi-layer barrier is disclosed in U.S. Pat. No. 5,038,833, wherein the primary application is rigid plastic pipes. An example of use in a refrigerant hose of a thermoplastic barrier layer is provided by U.S. Pat. No. 6,941,975, wherein the barrier layer requires two or three layers, including a layer of vinyl resin such as ethylene-vinyl alcohol copolymer ("EVOH") and outer layers of polyolefin and/or polyamide resin. Each resin layer has a thickness of from 0.025 to 0.25 mm. The only example provided in U.S. Pat. No. 6,941,975 used a 3-layer barrier with 0.15-mm total thickness and had a permeation rate for R134 refrigerant of $3.94 \times 10^{-5}$ g/cm/day based on a one-cm length of hose of undisclosed diameter. U.S. Pat. No. 7,504,151 discloses a refrigerant hose with a barrier layer of PA 6/66 copolymer, PA 11, PA 12, PA 6, or PA 6/12 compounded with nanofillers. U.S. Pat. No. 7,478,654 discloses a refrigerant barrier hose with a 2-layer barrier that includes as one of the layers a thermoplastic resin such as PA 6 or one of many others.

Reference is made to co-pending U.S. patent application Ser. No. 11/938,139 filed on Nov. 9, 2007, the entire contents of which are hereby incorporated herein by reference. That application discloses a flexible fuel hose having a non-fluorinated rubber inner tube, a non-fluorinated rubber outer cover, an intermediate barrier layer consisting essentially of EVOH having an ethylene content less than 30 mole %, and preferably a textile reinforcement between the barrier layer and the outer cover. A non-fluorinated rubber tie layer may be included between the barrier and the reinforcement. Permeability to ethanol- and methanol-containing fuels is very low. The EVOH layer may be extruded onto an unvulcanized rubber inner tube and an unvulcanized rubber outer cover extruded thereon. However, during handling of the resulting raw hose before and during vulcanization, the stiffness of the EVOH layer can result in kinking, delamination and other processing problems. As a result of this stiffness, EVOH-based hose failed the SAE J30R14 kink test.

SUMMARY

The present invention is directed to systems and methods which provide a low-permeation fuel hose suitable for example for use with alcohol-containing fuels and which is very flexible and easier to manufacture without kinking or delamination. The invention further provides an economical fuel hose in that fluorinated materials are not required. Specifically the present invention provides a very low permeation rubber fuel hose based on non-fluorinated elastomer with an intermediate PA 6 barrier layer, optionally reinforced with either textile or wire. The present invention may be embodied in a low permeation fuel hose with a barrier layer of PA 6 having a non-linear or branched molecular structure and an impact modifier with no additional thermoplastic or fluorinated-polymer barrier layers. Alternately, the PA 6 barrier layer may have a flexural modulus of about 2 GPa or less and an elongation of about 100% or more. The PA 6 barrier layer may be Technyl® C 548B, which is sold under that trademark by Rhodia Engineering Plastics.

Embodiments of the present invention are directed to a fuel hose comprising a rubber inner tube, an intermediate barrier layer comprising PA 6 having a branched molecular structure and an impact modifier, and a rubber outer cover. The barrier layer may consist essentially of the PA 6 layer or may consist of the PA 6 layer. The thickness of the barrier layer may be in the range from 0.025-0.76 mm (1 to 30 mils), preferably from 0.025-0.38 mm (1 to 15 mils), or from 0.07-0.18 mm (3 to 7 mils), or up to 10 mils thick. The inner tube and outer cover may comprise acrylonitrile-butadiene rubber (NBR), hydrogenated acrylonitrile-butadiene rubber (HNBR), epichlorohydrin rubber (ECO), chlorosulfonated polyethylene (CSM), polychloroprene rubber (CR), chlorinated polyethylene (CPE), ethylene-vinyl acetate (EVM), or nitrile-polyvinylchloride (NBR-PVC) blended elastomer, thermoplastic elastomer (TPE), and the like. Both of the inner tube and a tie layer may comprise the same rubber composition. Preferably, neither the inner tube, the tie layer, the outer cover, nor the barrier layer need comprise fluoropolymer. Textile or wire reinforcement may be applied directly to the PA 6 barrier layer, or to a friction or tie layer which may be applied to the barrier layer prior to the reinforcement. An adhesion system, such as a resorcinol, formaldehyde donor, and silica (RFS) system, may be used in the friction layer and/or the inner tube layer to promote adhesion to the PA 6. The need for reinforcement may be significantly reduced by the PA 6 barrier layer due to an increase in burst strength.

In another embodiment, the inventive hose may comprise two or more layers, or two to five layers, including a thin layer of PA 6 as described herein. The PA 6 layer may preferably have a thickness of up to 0.010 inches (0.25 mm). The PA 6 may preferably be of sufficient thickness, or an effective thickness, to provide reduced permeation of a specified or predetermined fuel or fuel component of less than or equal to 15 grams per square meter per day. The predetermined fuel component may be methanol or ethanol. The other layers may be or include a reinforcement such as a textile or wire, a different thermoplastic material including for example a TPE, a thermoset material such as a rubber or a crosslinked thermoplastic.

The present invention is also directed to a hose assembly or fuel system employing a fuel hose according to the above description and at least one fitting, such as a clamp, coupling, connector, nipple, tubing, or the like, and/or a fuel or fluid handling component such as a tank, pump, canister, rail, or injector or the like.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
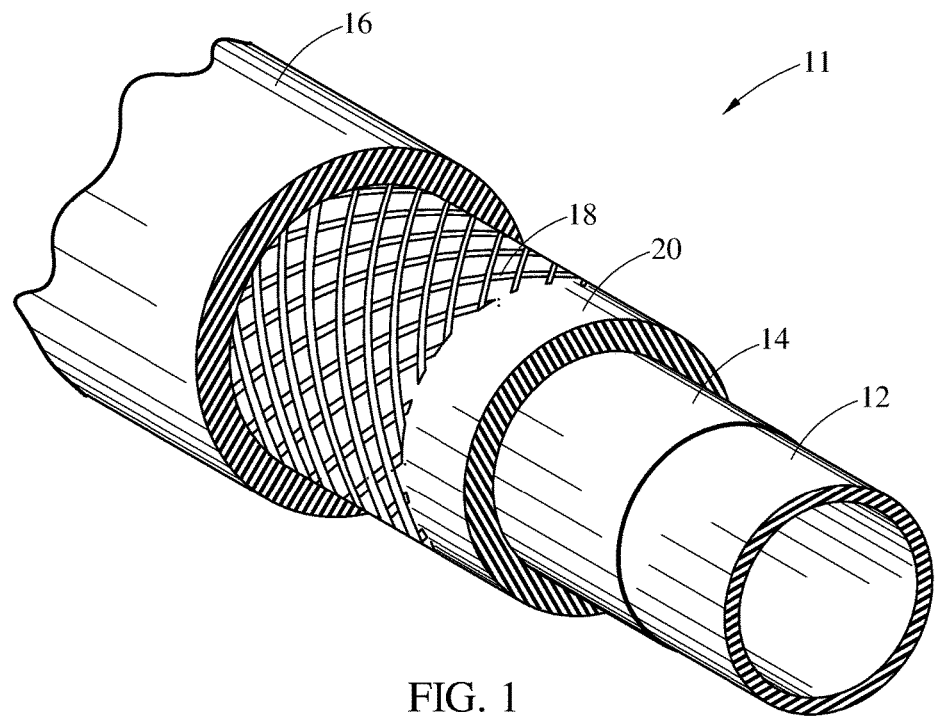
FIG. 1 is a partially fragmented perspective view of an embodiment of a hose constructed in accordance with the present invention.

Referring to FIG. 1, a hose is illustrated, constructed according to one embodiment of the present invention. Hose 11 comprises inner tube 12, intermediate thermoplastic barrier layer 14 of polyamide 6 (PA 6), and outer cover 16. Optionally, hose 11 may comprise reinforcement layer 18 positioned somewhere within the hose. As another option, hose 11 may comprise one or more tie layers and/or adhesive coatings between various layers. FIG. 1 shows reinforcement layer 18 applied over tie layer 20. Intermediate layer 14 could be disposed within one of the rubber layers, thus effectively splitting that rubber layer into two separate layers.

Intermediate barrier layer 14 comprises PA 6 preferably having a branched molecular structure, i.e., not a linear polymeric structure. The thickness of the intermediate layer may be in the range from 0.025 to 0.76 mm (1 to 30 mils), preferably from 0.025 to 0.38 mm (1 to 15 mils), or from 0.05 to 0.25 mm (2 to 10 mils). PA 6 is believed to be a good permeation barrier to gases because it is a semi- to highly crystalline polymer and because of the high cohesive energy of the amide groups. Generally, the higher the crystallinity, the lower the permeability. However, high crystallinity makes PA 6 a brittle, rigid polymer with poor low-temperature flexibility. The higher the branching in the PA 6, the lower the crystallinity and the higher the flexibility. The presence of impact modifier also increases flexibility. Thus, prior applications have used rigid PA 6 grades as a rigid structural material and/or have used thin conventional PA 6 layers coupled with additional layers of other barrier materials such as fluoropolymers, polyolefins, EVOH, and/or the like. However, in accordance with embodiments of the present invention, a flexible fuel hose with exceptionally low permeability to various fuels such as indolene, gasoline, biodiesel, diesel, alcohols, and alcohol-containing fuels, can be constructed using a single barrier layer comprising or even consisting essentially of or consisting of PA 6, preferably PA 6 having a branched structure and an impact modifier or having a flexural modulus of about 2 GPa or less and an elongation of about 100% or more.

PA 6 is also variously identified as polycaprolactam, nylon 6, and polycaproamide. Herein, the term PA 6, or "comprising PA 6" could also include polymer blends of PA 6 and other polymers. For example, without limitation, PA 6 herein could include blends of PA 6 with one or more of PA 11, PA 12, PA 66, PA 610, PA 612, PA 46, and the like. In addition, the blends could include impact modifiers or other additives such as those described herein. Alternately, PA 6 herein could be substantially PA 6 without any other blended polymers other than impact modifiers.

Regarding the aforementioned cohesive energy of the amide groups, PA 6 may exhibit an associated sensitivity to moisture, resulting in increased permeability in high humidity environments. Such humid environments may be present at almost any time during the life of a hose, from a steam vulcanization environment during manufacture of a hose to the place of use in a vehicle in a wet or humid climate. In accordance with embodiments of the present invention, the use of suitable non-fluorinated rubber inner tube and outer cover layers sufficiently protects the PA 6 barrier layer from moisture. Suitable rubber compositions may be based on NBR, HNBR, CSM, CR, ECO, EVM, CPE, NBR-PVC, ethylene methylacrylate elastomer (EAM), acrylic or acrylate elastomer (ACM), or TPE, or the like. Preferred rubber compositions for the inner tube for alcohol-containing fuels are based on NBR, NBR-PVC, ECO, and/or HNBR. It should be understood that steps may nevertheless be taken to prevent detrimental exposure to steam or moisture, such as sealing the ends of the hose during vulcanization, and the like.

resistance to permeation by creating or forcing a more tortuous molecular route for diffusing substances. The presence of impact modifier is believed to provide needed flexibility for processing the PA 6 and eliminating kinking problems and may also enhance the resistance to permeation. Preferably, suitable PA 6 for the practice of this invention has a relatively high viscosity and a relatively low melt flow rate. Suitable PA 6 may preferably be a blow-molding grade or may be an extrusion grade. Suitable PA 6 has a melting temperature of 200-240° C. or of about 220° C. or about 222° C., which is well above the temperature at which inner tube and outer cover rubber compositions are typically extruded, vulcanized or cured. Suitable PA 6 should have a relatively low flexural modulus, for example, flexural modulus may be in the range of less than about 2 GPa, or from about 1 to about 2 GPa and may be tested according to the test method of ISO 178. Suitable PA 6 should also have a relatively high tensile strain at break or "elongation." For example, elongation may be in the range of about 100% or more and may be tested according to the test method of ISO 527.

A preferred grade of PA 6 is Technyl® C 548B, which is sold under that trademark by Rhodia Engineering Plastics. Other suitable grades may include Technyl® C 536XT and C 442, from Rhodia. As non-limiting examples, other suitable grades may include: Capron® 8259, sold under that trademark by BASF; and Aegis™PL220HS, sold under that trademark by Honeywell; and Renol 6253, sold under that trade name by Clariant. Table 1 lists some properties of one or more suitable grades of PA 6.

TABLE 1

| Properties | Standards | Units | Values* for Technyl ® C 548B | Technyl ® C 536XT |
|---|---|---|---|---|
| Physical | | | | |
| Water absorption (24 h at 23° C.) | ISO 62 | % | 1.20 | |
| Density | ISO 1183-A | g/cm$^3$ | 1.05 | |
| Molding shrinkage Parallel | RHODIA-EP | % | 1.20 | |
| Molding shrinkage normal or perpendicular | RHODIA-EP | % | 1.25 | |
| Molding Shrinkage Isotropy | RHODIA-EP | | 0.96 | |
| Mechanical | | | | |
| Tensile modulus | ISO 527 type 1 A | MPa | 1850/1000 | 2340/700 |
| Tensile strength at yield | ISO 527 type 1 A | MPa | 55/45 | 60/— |
| Tensile strain at break | ISO 527 type 1 A | % | 150/220 | 55/170 |
| Flexural modulus | ISO 178 | MPa | 1750/850 | |
| Flexural maximum stress | ISO 178 | MPa | 70/45 | |
| Charpy notched impact strength | ISO 179/1eA | kJ/m$^2$ | 92/NB | 73/130 |
| Charpy unnotched impact strength | ISO 179/1eU | kJ/m$^2$ | NB/NB | |
| Izod notched impact strength | ISO 180/1A | kJ/m$^2$ | 90/NB | |
| Thermal | | | | |
| Melting Temperature | ISO 11357 | ° C. | 222 | 220 |
| Heat deflection temperature, 1.8 Mpa | ISO 75/Af | ° C. | 55 | 56 |
| Coef. of Linear thermal expansion normal or perpendicular (23° C. to 85° C.) | ISO 11359 | 10$^{-5}$/° C. | 7 | |
| Typical processing Temperature | RHODIA-EP | ° C. | 210-240 | |
| Electrical | | | | |
| Relative permittivity | IEC 60250 | | 3.70/4 | |
| Dissipation factor | IEC 60250 | | 0.02/0.12 | |
| Volume resistivity | IEC 60093 E14. | Ohm · cm | 10/0.001 | |
| Surface resistivity | IEC 60093 E14. | Ohm | 1/0.001 | |
| Dielectric strength | IEC 60243 | kV/mm | —/17 | |

*Where two values are indicated, the first value is for "d.a.m." i.e., Dry As Molded compound, and the second value is for material conditioned according ISO 1110.

Suitable grades of PA 6 for the barrier layer include those with a branched molecular structure and an impact modifier. The branched molecular structure is believed to improve Useful grades of PA 6 may have one or more impact modifiers. Impact modifiers for polyamide include natural and synthetic polymer substances that are elastomeric or rubbery at room temperature and may also have a tensile modulus of elasticity of less than 500 MPa as measured in accordance with ASTM D882. The impact modifier may, for example, be an (ethylene and/or propylene)/α-olefin copolymer; an (ethylene and/or propylene)/(α,β-unsaturated carboxylic acid and/or an unsaturated carboxylic acid ester) copolymer; an ionomer polymer; an aromatic vinyl compound/a conjugated diene compound block copolymer or a polyamide elastomer. These materials may be used alone or in blends.

The above-mentioned (ethylene and/or propylene)/α-olefin copolymer is a polymer obtained by copolymerizing ethylene and/or propylene with an α-olefin having at least 3 carbon atom. The α-olefin having at least 3 carbon atom may be propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 4-methyl-1-butene, 3-methyl-1-pentene, 3-ethyl-1-pentene, 1-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-l-dodecene or 12-ethyl-1-tetradecene, or a combination thereof.

Further, a polyene of a non-conjugated diene such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, dicyclobutadiene, methylene norbornene, 5-vinyl norbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene or 2-propenyl-2,2-norbornadiene, may be copolymerized as a third monomer for example to provide crosslinking sites.

The above-mentioned (ethylene and/or propylene)/(an α,β-unsaturated carboxylic acid and/or an unsaturated carboxylic acid ester) copolymer is a polymer obtained by copolymerizing ethylene and/or propylene with an α,β-unsaturated carboxylic acid and/or an unsaturated carboxylic acid ester monomer. The α,β-unsaturated carboxylic acid monomer may be acrylic acid or methacrylic acid, and the α,β-unsaturated carboxylic acid ester monomer may be a methyl ester, an ethyl ester, a propyl ester, a butyl ester, a pentyl ester, a hexyl ester, a heptyl ester, an octyl ester, a nonyl ester or a decyl ester of such an unsaturated carboxylic acid, or a mixture thereof.

The above-mentioned ionomer polymer is one having at least some of carboxyl groups of a copolymer of an olefin with an α,β-unsaturated carboxylic acid ionized by neutralization with metal ions. As the olefin, ethylene is preferably employed, and as the α,β-unsaturated carboxylic acid, acrylic acid or methacrylic acid is preferably employed. However, they are not limited to those exemplified here, and an unsaturated carboxylic acid ester monomer may be copolymerized thereto. Further, the metal ions may, for example, be Al, Sn, Sb, Ti, Mn, Fe, Ni, Cu, Zn or Cd, in addition to an alkali metal or an alkaline earth metal, such as Li, Na, K, Mg, Ca, Sr or Ba.

Further, the aromatic vinyl compound/a conjugated diene compound block-copolymer is a block copolymer comprising aromatic vinyl compound polymer blocks and conjugated diene compound polymer blocks, and a block copolymer having at least one aromatic vinyl compound polymer block and at least one conjugated diene compound polymer block, is employed. Further, in such a block copolymer, the unsaturated bond in the conjugated diene compound polymer block may be hydrogenated.

The aromatic vinyl compound polymer block is a polymer block composed mainly of structural units derived from an aromatic vinyl compound. In such a case, the aromatic vinyl compound may, for example, be styrene, α-methylstyrene, o-methylstyrene, m-methyl styrene, p-methyl styrene, 1,3-dimethyl styrene, 2,4-dimethylstyrene, vinyl naphthalene, vinyl anthracene, 4-propylstyrene, 4-cyclohexyl styrene, 4-dodecylstyrene, 2-ethyl-4-benzyl styrene or 4-(phenylbutyl)styrene. The aromatic vinyl compound polymer block may have structural units made of one of more types of the above-mentioned monomers. Further, the aromatic vinyl compound polymer block may have structural units made of a small amount of other unsaturated monomers, as the case requires.

The conjugated diene compound polymer block is a polymer block formed of one or more types of conjugated diene compounds such as 1,3-butadiene, chloroprene, isoprene, 2,3-dimethyl-1,3-butadiene, 1,3-pentadiene, 4-methyl-1,3-pentadiene and 1,6-hexadiene. In the hydrogenated aromatic vinyl compound/conjugated diene block copolymer, some or all of unsaturated bond portions in the conjugated diene compound polymer block are hydrogenated to saturated bonds. Here, the distribution in the polymer block composed mainly of a conjugated diene may be random, tapered, partially blocked or an optional combination thereof.

The molecular structure of the aromatic vinyl compound/conjugated diene compound block copolymer or its hydrogenated product, may be linear, branched, radial or an optional combination thereof. Among them, in the present invention, as the aromatic vinyl compound/conjugated diene block copolymer and/or its hydrogenated product, at least one of a diblock copolymer wherein one aromatic vinyl compound polymer block and one conjugated diene compound polymer block are linearly bonded; a triblock copolymer wherein three polymer blocks are linearly bonded in the order of an aromatic vinyl compound polymer block/conjugated diene compound polymer block/aromatic vinyl compound polymer block; and their hydrogenated products, is preferably employed. Specifically, a non-hydrogenated or hydrogenated styrene/butadiene copolymer, a non-hydrogenated or hydrogenated styrene/isoprene copolymer, a non-hydrogenated or hydrogenated styrene/isoprene/styrene copolymer, a non-hydrogenated or hydrogenated styrene/butadiene/styrene copolymer or a non-hydrogenated or hydrogenated styrene/(isoprene/butadiene)/styrene copolymer may, for example, be mentioned.

The above-mentioned polyamide elastomer is a block copolymer comprising mainly polyamide-forming units as hard segments and polyether units or polyether ester units formed by polycondensation of a polyether with a dicarboxylic acid, as soft segments. It may, for example, be a polyether ester amide elastomer or a polyether amide elastomer. The polyamide-forming unit as such a hard segment may, for example, be a lactam of at least 3-membered ring, an aminocarboxylic acid or a nylon salt made of a dicarboxylic acid and a diamine. The lactam of at least 3-membered ring may, for example, be ε-caprolactam or laurolactam. The aminocarboxylic acid may, for example, be 6-aminocaproic acid, 11-aminoundecanoic acid or 12-aminododecanoic acid.

As the dicarboxylic acid to constitute the nylon salt, a $C_{2-36}$ dicarboxylic acid is usually employed. Specifically, it may, for example, be an aliphatic dicarboxylic acid such as adipic acid, pimelic acid, suberic acid, azelaic acid, sebacic acid, undecanedione acid, dodecanedione acid or 2,2,4-trimethyladipic acid; an alicyclic dicarboxylic acid such as 1,4-cyclohexanedicarboxylic acid; or an aromatic dicarboxylic acid such as terephthalic acid, isophthalic acid, phthalic acid or xylene dicarboxylic acid. Further, as a $C_{36}$ dicarboxylic acid, a dimeric fatty acid may be mentioned. The dimeric fatty acid is a polymerized fatty acid obtainable by polymerizing e.g. a $C_{8-24}$ saturated, ethylenically unsaturated, acetylenically unsaturated, natural or synthetic monobasic fatty acid.

As the diamine to constitute the nylon salt, a $C_{2-36}$ diamine is usually employed. Specifically, it may, for example, be an aliphatic diamine such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine or 2,2,4/2,4,4-trimethylhexamethylenediamine; an alicyclic diamine such as 1,3/1,4-cyclohexanedimethylamine or bis(4,4'-aminocyclohexyl)methane; or an aromatic diamine such as xylylene diamine. Further, as a $C_{36}$ diamine, a dimeric amine having carboxyl groups of the dimeric fatty acid changed to amino acids, may be mentioned.

Further, the polyether unit as a soft segment may, for example, be polyethylene glycol, polypropylene glycol, polytetramethylene glycol, polyhexamethylene glycol tetrahydrofuran or a copolymer prepared by using a plurality of such polyether-forming monomers.

The polyether ester amide elastomer is a polyamide elastomer comprising the above polyether and the above polyamide-forming unit having terminal carboxyl groups prepared by introducing the above-mentioned dicarboxylic acid. Further, the polyether amide elastomer is a polyamide elastomer comprising a polyether unit obtained by substituting an amino group and/or a carboxyl group for the terminal hydroxyl group of the above-mentioned polyether, and a polyamide-forming unit having a carboxyl group and/or an amino terminal group.

Further, the above-mentioned (ethylene and/or propylene)/α-olefin copolymer, the (ethylene and/or propylene)/(α,β-unsaturated carboxylic acid and/or unsaturated carboxylic acid ester) copolymer, the ionomer polymer, the block copolymer of an aromatic vinyl compound and a conjugated diene compound, to be used as an impact modifier, is employed preferably in the form of a polymer modified by a carboxylic acid and/or its derivative.

As the carboxylic acid and/or its derivative to be used for the modification, a carboxylic acid group, a carboxylic anhydride group, a carboxylic acid ester group, a carboxylic acid metal salt group, a carboxylic acid imide group, a carboxylic acid amide group or an epoxy group may, for example, be mentioned. Examples for a compound containing such a functional group include acrylic acid, methacrylic acid, maleic acid, fumaric acid, itaconic acid, crotonic acid, methyl maleic acid, methyl fumaric acid, metaconic acid, citraconic acid, glutaconic acid, cis-4-cyclohexene-1,2-dicarboxylic acid, endcis-bicyclo[2,2,1]hepto-5-ene-2,3-dicarboxylic acid and metal salts of these carboxylic acids, monomethyl maleate, monomethyl itaconate, methyl acrylate, ethyl acrylate, butyl acrylate, 2-ethylhexyl acrylate, hydroxyethyl acrylate, methyl methacrylate, 2-ethylhexylmethacrylate, hydroxyethyl methacrylate, aminoethyl methacrylate, dimethyl maleate, dimethyl itaconate, maleic anhydride, itaconic anhydride, citraconic anhydride, endobicyclo-[2,2,1]-5-heptene-2,3-dicarboxylic acid anhydride, maleimide, N-ethyl maleimide, N-butyl maleimide, N-phenyl maleimide, acrylamide, methacrylamide, glycidyl acrylate, glycidyl methacrylate, glycidyl ethacrylate, glycidyl itaconate and glycidyl citraconate.

By the use of impact modified PA 6, the resulting hose should have good flexibility and kink resistance. The amount of the impact modifier may be from 1 to 25% by weight, preferably from 3 to 10%, based on the total weight of the polyamide compound. If the amount of the impact modifier exceeds 25%, the strength of the material may tend to decrease.

Thus the impact modifier for the polyamide may be an elastomer or a rubbery polymer, preferably grafted with functional groups chosen from carboxylic acids and acid anhydrides. The grafting of acid anhydride functions of copolymers is generally achieved by copolymerization in the presence of maleic anhydride.

The rubbery polymers which may be used as impact modifiers may be alternately or additionally defined as having a tensile modulus to ASTM D-638 of less than about 40,000 MPa, generally less than 25,000, and preferably less than 20,000. They may be random or block copolymers. Useful rubbery polymers may be prepared from reactive monomers which can be part of the chains or branches of the polymer, or can be grafted onto the polymer. These reactive monomers may be dienes or carboxylic acids or their derivatives, such as esters or anhydrides. Amongst these rubbery polymers mention may be made of butadiene polymers, copolymers of butadiene/styrene, isoprene, chloroprene, copolymers of acrylonitrile/butadiene, isobutylene, copolymers of isobutylene-butadiene or copolymers of ethylene/propylene (EPR), copolymers of ethylene/propylene/diene (EPDM). As useful rubbery polymers mention may be made of aromatic vinylic monomers, olefins, acrylic acid, methacrylic acid and derivatives of these, ethylene-propylene-diene monomers, and metal salts of these. Some useful rubbery polymers are described in the patents U.S. Pat. Nos. 4,315,086 and 4,174,358, the relevant portions of which are hereby incorporated herein by reference.

A preferred impact modifier for carrying out the invention is a grafted copolymer which is a copolymer of ethylene and of an α-olefin other than ethylene having, grafted onto the ethylene copolymer, a functionality such as carboxylic or anhydride functions. The ethylene and the α-olefin are preferably a copolymer of ethylene and of an α-olefin selected from an α-olefin containing from 3 to 8 carbon atoms and preferably from 3 to 6 carbon atoms. A preferred α-olefin monomer in the copolymer is propylene. Other α-olefins, such as 1-butene, 1-pentene and 1-hexene, may be used in the copolymers in place of or in addition to propylene. In one preferred manner of working the invention, mention may be made of maleic-anhydride-grafted ethylene-propylene rubbers and maleic-anhydride-grafted ethylene-propylene-diene rubbers.

Alternately, the impact modifier may be selected from the group consisting of maleic-anhydride-grafted ethylene-propylene rubber, maleic-anhydride-grafted ethylene-propylene-diene rubber, maleic-anhydride-grafted polyethylenes, and maleic-anhydride-grafted polypropylene.

To reduce the permeability of the polyamide 6 barrier layer, it is possible to add lamellar nanofillers to the thermoplastic matrix. Such a reduction in permeability is attributed to an effect of "tortuousness" brought about by the lamellar nanofillers. This is because the gases or the liquids have to follow a much longer pathway because of these obstacles arranged in successive strata. Theoretical models regard the barrier effects as becoming more pronounced as the aspect ratio, that is to say the length/thickness ratio, increases. The lamellar nanofillers which are most widely investigated today are clays of smectite type, mainly montmorillonite. The difficulty of use lies first of all in the more or less extensive separation of these individual lamellae, that is to say the exfoliation, and in their distribution, in the polymer. To help in the exfoliation, use may be made of an "intercalation" technique, which consists in swelling the crystals with organic cations, generally quaternary ammonium cations, which will compensate for the negative charge of the lamellae. These crystalline aluminosilicates, when they are exfoliated in a thermoplastic matrix, exist in the form of individual lamellae, the aspect ratio of which may reach values of the order of 500 or more.

The polyamide 6 of the present invention may also utilize particles based on zirconium, titanium, cerium and/or silicon phosphate, in the form of non-exfoliated nanometric lamellar compounds, as disclosed for example in U.S. Pat. Pub. No. 2007/00182159A1, the relevant portions of which are hereby incorporated herein by reference. Such in PA 6 exhibits good barrier properties to liquids and to gases and/or good mechanical properties, such as, for example, a good modulus/impact compromise, and/or a temperature stability which allows it to be handled and used at high temperatures. The particles based on zirconium, titanium, cerium and/or silicon phosphate, present in the PA 6 composition, may be such that at least 50% by number of the particles are in the form of nanometric lamellar compounds exhibiting an aspect ratio of less than or equal to 100.

The term "nanometric lamellar compound" is understood to mean a stack of several lamellae exhibiting a thickness of the order of several nanometers. The nanometric lamellar compound according to the invention can be non-intercalated or else intercalated by an intercalation agent, also referred to as swelling agent. The term "aspect ratio" is understood to mean the ratio of the greatest dimension, generally the length, to the thickness of the nanometric lamellar compound. Preferably, the particles of nanometric lamellar compounds exhibit an aspect ratio of less than or equal to 50, more preferably of less than or equal to 10, particularly of less than or equal to 5. Preferably, the particles of nanometric lamellar compounds exhibit an aspect ratio of greater than or equal to 1.

The term "a nanometric compound" is understood to mean a compound having a dimension of less than 1 µm. Generally, the particles of nanometric lamellar compounds of use exhibit a length of between 50 and 900 nm, preferably between 100 and 600 nm, a width of between 100 and 500 nm and a thickness of between 50 and 200 nm (the length representing the longest dimension). The various dimensions of the nanometric lamellar compound can be measured by transmission electron microscopy (TEM) or scanning electron microscopy (SEM). Generally, the distance between the lamellae of the nanometric lamellar compound is between 0.5 and 1.5 nm, preferably between 0.7 and 1.0 nm. This distance between the lamellae can be measured by crystallographic analytical techniques, such as, for example, X-ray diffraction.

Advantageously, 50% by number of the particles are in the form of nanometric lamellar compounds exhibiting an aspect ratio of less than or equal to 100. The other particles can be in particular in the form of individual lamellae, for example obtained by exfoliation of a nanometric lamellar compound. Preferably, at least 80% by number of the particles are in the form of nanometric lamellar compounds exhibiting an aspect ratio of less than or equal to 100. More preferably, approximately 100% by number of the particles are in the form of nanometric lamellar compounds exhibiting an aspect ratio of less than or equal to 100.

The particles can optionally be gathered together in the form of aggregates and/or agglomerates in the PA 6 thermoplastic matrix. These aggregates and/or agglomerates can in particular exhibit a dimension of greater than one micron.

Use may also be made, for the PA 6 of the present invention, of particles of hydrated nanometric lamellar compounds based on zirconium, titanium, cerium and/or silicon phosphate, such as, for example, monohydrated or dihydrated compounds. Use may be made of zirconium phosphate, such as a ZrP of formula $Zr(HPO_4)_2$ or $\gamma ZrP$ of formula $Zr(H_2PO_4)_2(HPO_4)$. It is also possible to treat the particles based on zirconium, titanium, cerium and/or silicon phosphate with an organic compound before introduction into the thermoplastic matrix, in particular with an aminosilane compound, such as, for example, 3-aminopropyltriethoxysilane, or an alkylamine compound, such as, for example, pentylamine.

The PA 6 barrier layer composition according to the invention can comprise from 0.01 to 30% by weight of nanometric lamellar particles with respect to the total weight of the composition, preferably less than 10% by weight, more preferably from 0.1 to 10% by weight, more preferably still from 0.1 to 5% by weight, particularly from 0.3 to 3% by weight, very particularly from 1 to 3% by weight.

The PA 6 composition can, in addition, optionally include particles of nanometric lamellar compound having an intercalation agent which is intercalated between the lamellae of the particles and/or an exfoliation agent which is capable of exfoliating the lamellae of the particles, so as to completely separate the lamellae from one another in order to obtain individual lamellae. These particles can be nanometric lamellar compounds based on zirconium, titanium, cerium and/or silicon phosphate or any other type of compound, such as: natural or synthetic clays of the smectite type, such as, for example, montmorillonites, laponites, lucentiles or saponites, lamellar silicas, lamellar hydroxides, acicular phosphates, hydrotalcites, apatites and zeolitic polymers. The intercalation and/or exfoliation agents can be chosen from the group consisting of: NaOH, KOH, LiOH, $NH_3$, monoamines, such as n-butylamine, diamines, such as hexamethylenediamine or 2-methylpentamethylenediamine, amino acids, such as aminocaproic acid and aminoundecanoic acid, and amino alcohols, such as triethanolamine.

In general, tube 12 may comprise one or more layers of one or more flexible materials such as an elastomer or a plastic. Thus, the inner surface material of the tube may be chosen to withstand the fluids and environmental conditions expected within the hose. According to an embodiment of the invention, the inner tube is of a single non-fluorinated rubber formulation. The rubber formulation of the inner tube may be based on ECO, NBR, NBR-PVC blends, HNBR, TPE, or the like and may be formulated in accordance with known methods of rubber compounding. The rubber formulation may include a blend of elastomers, such as a blend of high- and low-acrylonitrile grades of NBR with PVC. The tube rubber composition may advantageously include adhesion promoter, such as a reactive resin system such as or equivalent to resorcinol, a formaldehyde donor, and silica this is commonly referred to as an "RFS" adhesion system, examples of which are disclosed in Th. Kempermann, et al., "Manual for the Rubber Industry," 2d Ed., Bayer AG, Leverkusen, Germany, pp 372 & 512-535 (1991) which is hereby incorporated herein by reference. The main purpose of this "RFS" system is to enhance adhesion between tube 12 and PA 6 barrier layer 14.

In general, tie layer 20 may be used to facilitate bonding between the PA 6 and the cover layer and/or the textile or wire reinforcement. A tie layer may comprise a rubber composition based on ECO, NBR, NBR-PVC, HNBR, TPE, or the like. The main purpose of the tie layer is to provide or promote adhesion, which is especially important when the cover does not have an adhesion promoter such as the "RFS" system and/or does not naturally adhere to well to the PA 6 layer. Both the inner tube and the tie layer may utilize the same rubber composition. The tie layer rubber composition may incorporate any suitable adhesion promoter or adhesion system, such as the RFS system described above. A tie layer may also be called a friction layer. A tie layer could be an adhesive coating.

In general, cover 16 may be made of one or more suitable flexible elastomeric or plastic materials designed to withstand the exterior environment encountered. According to an embodiment of the invention, the outer cover is of a single non-fluorinated rubber formulation. The rubber formulation of the outer cover may be based on HNBR, CSM, CR, ECO, EVM, ACM, EAM, NBR-PVC, or CPE, and the like, which may be formulated with other ingredients in accordance with known methods of rubber compounding. Tube 12 and cover 16 may be made of the same material composition or of different compositions. Preferably the cover is ozone resistant.

A preferred material for the inner tube and the tie layer is a rubber composition based on ECO. Suitable ECO includes epichlorohydrin homopolymer, or a copolymer of ethylene oxide and epichlorohydrin. A preferable ECO grade is a terpolymer including allyl glycidal ether ("GECO"), which provides sulfur- or peroxide-curable diene cure sites in addition to the typical de-chlorination cure sites of the epichlorohydrin. The secondary diene cure site may contribute to reduced permeation and improved sour gas resistance.

It should be understand that while a preferred embodiment includes no fluoropolymer components, that for very severe applications or very stringent permeation or environmental requirements, fluoropolymers may advantageously be included in one or more layers of the hose construction or as a tie layer.

As shown in FIG. 1 and mentioned above, reinforcement member 18l may be present in the hose. The reinforcement may be applied directly onto intermediate layer 14 and thereby at least a portion of the reinforcement may be in contact with the intermediate layer. Preferably, tie layer 20 is first applied to intermediate layer 14. Then, reinforcement 18 is applied onto tie layer 20. Outer cover 16 may substantially surround or penetrate reinforcement member 18 and also be in contact with at least a portion of the intermediate layer or in contact with tie layer 20. The outer cover may advantageously be a rubber composition formulated to bond to a textile or wire reinforcement and/or to the PA 6 intermediate layer. For example, the outer cover may be CSM or CM elastomer with silica filler and resorcinol-formaldehyde or phenol-formaldehyde resin as an RFS adhesion promoting system. A preferred arrangement is to apply a spiraled, knitted or braided layer of textile or wire onto the PA 6 barrier layer or onto a tie layer. In a spiral construction, for example, the spiraled layer may comprise two layers, each applied at or near the so-called lock angle or neutral angle of about 54° with respect to the longitudinal axis of the hose but with opposite spiral directions. However, the hose is not limited to spiral constructions. The textile or wire layer may be knit, braided, wrapped, woven, or non-woven fabric. It has been found that textile fiber or yarn used in combination with an ECO tube, PA 6 barrier, and CSM cover, results in a remarkable increase in burst pressure rating for the resulting hose. Thereby, the need for reinforcement in embodiments of the present hose may be reduced. Many useful fibers for reinforcement, such as nylon, polyester (PET) or aramid, may benefit from an adhesive treatment or another tie layer in order to achieve adequate bonding among the layers of the hose. Useful reinforcement materials include polyester, aramid, polyamide or nylon, rayon, vinylon, polyvinyl alcohol ("PVA"), metallic wire, and the like.

Hose 11 may be formed by methods such as molding, wrapping, and/or extrusion. For example, an inner tube may be extruded, then an intermediate layer of PA 6 may be extruded onto the inner tube. Then a tie layer may be extruded or applied to the intermediate layer. Preferably the barrier layer of PA 6 is disposed in the hose by extruding a tubular layer of PA 6 onto the inner tube in a continuous manner with no overlap or seam. A textile or wire reinforcement may then be spiraled, knit, wrapped, or braided onto the intermediate layer or a tie layer may be applied before the textile reinforcement. Then a cover stock may be applied. Alternately, the layers may be built up on a mandrel. Finally, the assembly may be cured or vulcanized, by heat or radiation, on a mandrel, for example in an oven or a steam vulcanizer, or wrapped, and/or according to other methods available to those skilled in the art. Preferably curing is done at a temperature below the melting temperature of the PA 6 layer.

One hose construction has been illustrated in FIG. 1. It should be understood that a wide variety of other constructions may be utilized in carrying out the invention. For example, the hose may have additional inner, outer, or intermediate layers comprising plastic or elastomeric compositions for particular purposes such as fluid resistance, environmental resistance, or physical characteristics and the like. As another example, additional textile or metal reinforcements, jackets, covers or the like may be utilized as needed or desired. Helical wires may be built into the hose wall or utilized inside the hose for collapse resistance. Textile reinforcements may be treated with adhesives, friction or skim layers, or the like.

Instead of extruding the barrier layer as a tube, films or tapes of barrier layers may be wrapped around an inner tube and the laps fused or melted to create a continuous barrier layer. Curved hose could be made with PA 6 barrier materials as well. For example, in a two step process, an uncured hose may be placed onto a curved mandrel or placed into a mold for vulcanization so that the hose would retain a curved shaped thereafter. Likewise, other known molding techniques may be utilized.

Figure 2:
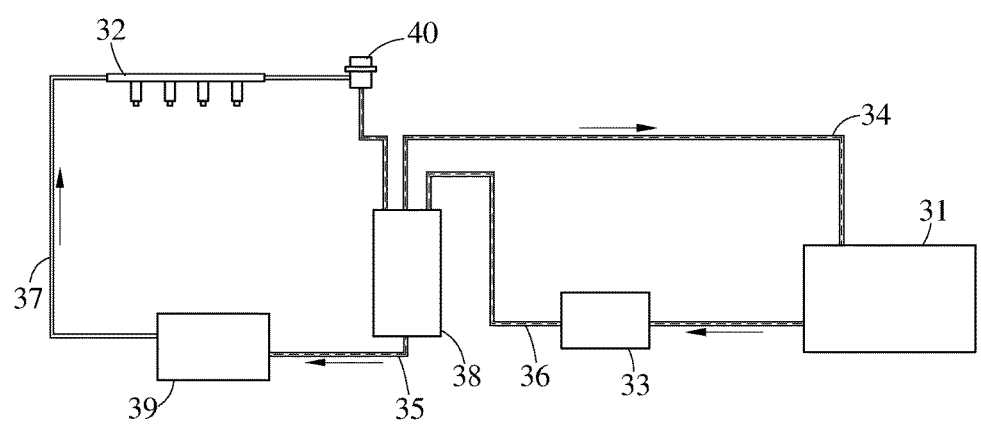
FIG. 2 is a schematic of an embodiment of a hose system constructed in accordance with the present invention.

In operation, a fuel hose may be a component of a hose assembly or a fuel line assembly or a fluid transfer system. A fluid transfer system generally comprises a hose, and at one or more ends of the hose, one or more clamps, couplings, connectors, tubing, nozzles, and/or fittings, fluid handling devices, and the like. By way of example, FIG. 2 is a schematic representation of a hose system employing embodiments of the inventive hose. In particular, FIG. 2 represents a typical automotive fuel system. Referring to FIG. 2, fuel tank 31, fuel pump 33, surge tank or reservoir 38 and fuel pump 39 may be connected by one or more fuel hose sections 35 and 36, provided by embodiments of the invention. Fuel return line 34 may also include a section of the present inventive hose. Hose sections 35, 36, and 34 may be of a low pressure construction employing embodiments of the present invention. Medium or high pressure hose section 37, according to an embodiment of the invention, may be used to connect fuel pump 39 to fuel rail 32 with its injectors and to fuel pressure regulator 40. It should be understood that a fuel system utilizing the inventive hose is not limited to automotive vehicle systems, but may include fuel transfer systems throughout the fuel supply chain, or fuel systems in marine applications, aviation, and the like, or anywhere else very low permeability flexible hose is desirable. For example, the inventive hose may be also useful for transporting other fluids, including gases, including for example oxygen, hydrogen, or carbon dioxide, liquefied or gaseous propane or natural gas, other fuels, and refrigerants, and the like, with minimal permeation losses.

Some examples based on film and hose testing follow which serve to illustrate the advantages of the present invention. Film testing was carried out on two films of impact-modified PA 6 according to the invention, i.e., Ex. 1 with Technyl® C 548B and Ex. 2 with C 536XT from Rhodia; and for comparison on two other films according to the art: Comp. (i.e., comparative) Ex. 2 with THV (THV 500G from Dyneon, a 3M Company) and Comp. Ex. 3 with EVOH (EVAL M100B from Kururay Co. Ltd. and EVAL Company of America.). The test used 0.13-mm (5-mil) films of each material in Thwing-Albert permeation cups, under conditions including 60° C. with CE10 (a mixture of ASTM Fuel C with 10% ethanol).

The same film materials, at the same thickness as the film tests, were incorporated into hose for Hose Permeation tests run at 60° C. and with a variety of test fuels, including ASTM Fuel C, CE10, and CM15 (a mixture of Fuel C with 15% methanol). Permeability of a hose was measured with a number of fuel-type fluids using the reservoir method in SAE J30 Section 9 but at an elevated temperature of 60° C. The method uses stationary fuel from a closed reservoir with a metallic plug to seal the end of the hose. Every week, the fuel was drained from the hose into the reservoir so fresher fuel would then be returned into the hose. The test duration was for 1000 hours of conditioning plus 10 days of permeation measurement. This method was used as a convenient way to screen constructions and to approximate the permeation measurement conditions of SAE J1737, a preferred standard in fuel permeation measurements. It may be noted that the method of SAE J1737 involves circulating hot fuel or vapor under controlled pressure. The hose examples were also tested with the procedure of SAE J1737 at 40° C. using indolene fuel.

As mentioned above, and illustrated in Table 2, the melt flow rate of the preferred PA 6 is relatively low, i.e., the viscosity is relatively high. The processing of the hose, in particular the extrusion of the barrier layer, was carried out with a rather large die (both gap and diameter), no breaker plate, at the highest recommended barrel temperatures 280-315° C. (550-600° F.), with a high shear screw, and using the drawn down approach to reduce the barrier layer thickness. These conditions permitted extrusion of the high-viscosity material without problems. In particular, the extrusion gap was about 1.5 mm (1/16 inch), and the draw down ratio was 19 to 64% depending on hose size.

TABLE 2

| Barrier Material | | Test conditions | Standard | Melt Flow Index |
|---|---|---|---|---|
| Ex. 1 | C 548B (PA 6) | 275° C./5-kg load | ISO 1133 | 3-8 [g/10 min] |
| Ex. 2 | C 536XT (PA 6) | — | — | — |
| Comp. Ex. 3 | THV 500G (THV) | 265° C./5-kg load | ASTM D1238 | 8-12 [g/10 min] |
| Comp. Ex. 4 | Eval M100B (EVOH) | 275° C./2.16-kg load | ISO 1133 | 1-3.5 [g/10 min] |

The permeation results for both film and hose are shown in Table 3. For each of the tests reported, the PA 6 material had much better performance (lower permeation rate) than THV or EVOH. In addition, the C 548B PA 6 material exhibited no problems with kinking during processing for all sizes of hose built thus far (3/16", 1/4", 5/16", 3/8", and 1/2" ID). The fuel hose utilizing C 548B PA 6 material as a barrier does pass the kink resistance test in SAE J30R7 and R14 while the EVOH barrier hose failed those tests. The C 548B PA 6 material exceeds the permeation resistance of competitive materials as well as the requirements of many of the current governmental standards.

TABLE 3

| Properties | Method | Units | Ex. 1 | Ex. 2 | Comp. Ex. 3 | Comp. Ex. 4 |
|---|---|---|---|---|---|---|
| Barrier Material | | | Technyl® C 548B PA 6 | Technyl C536XT PA 6 | THV 500G | EVAL M100B EVOH |
| Film Permeation | Thwing-Albert 60° C./CE10 | g/m²/d | 50 | 35 | 180 | 65, 40 |
| Hose Permeation | SAE J30 60° C./Fuel C | g/m²/d | 2 | — | 36 | 21 |
| Hose Permeation | SAE J30 60° C./CE10 | g/m²/d | 4 | — | 70 | 40 |
| Hose Permeation | SAE J30 60° C./CM15 | g/m²/d | 18 | — | 49 | 58 |
| Hose Permeation | SAE J1737, 40° C./Indolene | g/m²/d | 0.9 | — | 8 | 1.9 |

It should also be noted that the example hoses were constructed with 6-mm (1/4-inch) inside diameter and in accordance with an embodiment of the present invention with an ECO (GECO) rubber inner tube including an RFS adhesion promoting system 1.0-mm (40-mil) thick; a 0.13- mm (5-mil) thick intermediate barrier layer; a tie layer of the same ECO rubber as the tube but 0.5-mm (20-mil) thick; a PET spiral-wrapped double-layer yarn reinforcement; and a CSM rubber outer cover layer 1.0-mm (40-mil) thick. Comp. Ex. 3 represents a commercial fuel hose having an NBR tube 1-mm thick, a 0.13-mm thick THV barrier, an NBR tie layer 0.5-mm thick, a nylon reinforcement, and a CSM cover 1.25-mm thick. Comp. Ex. 3 was designed to meet the permeation requirements of SAE J30R11 or R12 for fuel hose. Comp. Ex. 4 is based on co-pending U.S. patent application Ser. No. 11/938,139 with EVOH (EVAL M100B) as the barrier layer but otherwise similar construction to Ex. 1 except the reinforcement was nylon and the cover was 1.25-mm thick.

The results of the permeability testing, presented in Table 3, show the dramatic improvement in impermeability of the inventive Example hose over the comparative hoses. As a general observation, it appears that the inventive hose is about 2 to 10 times lower in permeability to various fuels than the best comparative hoses.

The permeation rate for the inventive example may also be compared to some of the patents mentioned in the above background section, as well as to various fuel hose standards such as SAE J30 or SAE J1527 for marine applications. For example, SAE J30 R6, R7,-R8 and R9 applies to conventional rubber hoses without barrier layers which are tested at room temperature, with closed reservoir and no circulation. R9 requires a permeability to Fuel C of <15 g/m$^2$/day. R6, R7, and R8 require permeability to Fuel C of <600, <550, and <200 g/m$^2$/day, respectively. SAE J1527 Class 1-15 requires <15 g/m$^2$/day for Fuel CE10. SAE J30 R11 and R12 apply to low-permeation hoses which are tested according to SAE J1737 at 40° C. and 60° C. respectively, under pressures of 14.5 kPa (2.1 psi) and 0.2 MPa (29 psi) respectively, and with circulation, and require a permeability for CM15 (a much more aggressive test fuel than Fuel C) of <25 g/m$^2$/day for category A (the most stringent rating). The temperature increase alone from room temperature to 40° C. is expected to increase the permeability by a factor of about 10 times, partly due to increased diffusion rate and partly due to increased vapor pressure of fuel in the closed reservoir. The present stationary fuel test has been carried out at 60° C. which is expected to increase the permeability by an additional factor of about 20 times over a 40° C. test, all other factors constant. The pressure of the R11 test condition is probably not much different from the vapor pressure in a closed reservoir at elevated temperature. However, the effects of circulation and pressure in the R12 test may be estimated to increase the permeability by a factor of up to about 20 times over a stationary test at 40° C. Thus, the inventive hose, having permeability to stationary CM15 fuel of about 0.5 g/m$^2$/day at 60° C., is estimated to be about 1000 times better (25×20/0.5) than required by the R11 standard and to comfortably meet the R12 standard. Thus, the inventive hose is well suited for handling the increased impermeability demands associated with alcohol-containing fuels.

Actual testing according to SAE J1737 at 40° C. with indolene at 0.2 MPa (29 psi) pressure was carried out on the Example inventive hose and on a comparative fluoropolymer barrier hose. The inventive hose exhibited a permeation rate of 0.9 g/m$^2$/day. The comparative fluoropolymer barrier hose exhibited a permeation rate of 8 g/m$^2$/day. Thus, the inventive hose may provide a permeability to CM15 or CE10 Fuel of less than 2 g/m$^2$/day at 40° C. or less than 40 g/m$^2$/day at 60° C. when tested according to SAE J1737, or less than 20 g/m$^2$/day at 60° C. when tested according to a SAE J30 Section 9.

For a comparison to other barriers, the laminate barrier of U.S. Pat. Publication No. 2003/87053 exhibited permeability to CE10 fuel of 1.6 g/m$^2$/day at room temperature. As mentioned above, increasing the temperature from room temperature to 60° C. is expected to increase the permeation by a factor of 200 times. Thus, the example inventive hose is about 100 times better than the laminate of U.S. Pat. Publication No. 2003/87053.

Comparison with the hose disclosed in U.S. Pat. No. 6,941,975, which exhibited permeability of 3.94×10$^{-5}$ g/cm/day for refrigerant 134A at 90° C., is difficult without information on the hose diameter or area per cm length. Nevertheless, it is believed that the inventive hose would be at least comparable to that hose in permeability, while the inventive hose advantageously accomplishes low permeation without use of a multi-layered barrier. Thus, an embodiment of the inventive hose may also be useful for refrigerant applications.

The example hoses were also tested for bursting pressure. The typical fuel hose application generally requires a working pressure of less than 0.7 MPa (100 psi). With typical spiraled nylon reinforcement, rubber hose generally exhibits a burst pressure of about 1.7 to 2.4 MPa (250 to 350 psi). With the addition of the 0.13-mm (5-mil) layer of PA 6, the inventive Example 1 hose with PET reinforcement exhibited a burst pressure of about 4.1 MPa (600 psi), somewhat higher than expected. Thus, the need for reinforcement may be reduced in the inventive hose, or the working pressure significantly increased.

Flexibility testing at low temperatures was carried out on the inventive example hose. The inventive fuel hose of Example 1 met the SAE J30R14 cold flexibility standard, kink resistance, and permeation requirements.

In the course of investigating embodiments of the invention, it was discovered that bio-diesel fuels were unexpectedly more aggressive permeants than petroleum-based or conventional diesel, particularly in conventional NBR or HNBR or ECO type fuel hoses, resulting failures of the outer cover, particularly CSM, CR, or EPDM covers. Inventive hoses such as Ex. 1 and Ex. 2 above have been found to solve this problem. It also believed that the barriers in the comparative examples would also solve this problem with bio-diesel. Thus, another invention or embodiment is the use of a barrier layer as described herein in a multi-layer bio-diesel fuel hose to solve the problem of bio-diesel permeation.

It should be understood that the inventive concept could also be advantageously utilized in a hose having a fluoropolymer inner tube and/or outer cover by incorporating an intermediate PA 6 barrier layer. The permeation rate should be excellent, although the cost would be significantly higher than for a non-fluoroelastomer hose at current elastomer prices.

The PA 6 may preferably be of sufficient thickness, or an effective thickness, to provide reduced permeation of a specified or predetermined fuel or fuel component of less than or equal to 15 grams per square meter per day tested for example according to SAE J1737 at a temperature such as at 25° C., 40° C. or 60° C. Preferably the PA 6 is one of the specific grades mentioned herein, or with a set of characteristics as described herein, or most preferably Technyl® C 548B, which is sold under that trademark by Rhodia Engineering Plastics.

Figure 3:
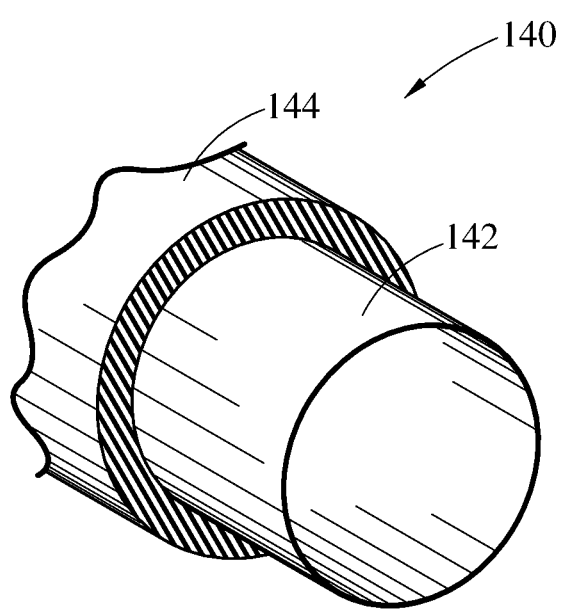
FIG. 3 is a partially fragmented perspective view of another embodiment of a hose constructed in accordance with the present invention.

In another embodiment, the inventive hose may comprise two or more layers, or preferably two to five layers, including a thin layer of PA 6 as described herein. The PA 6 layer may preferably have a thickness of up to 0.010 inches (0.25 mm). The PA 6 may preferably be of sufficient thickness, or an effective thickness, to provide reduced permeation of a specified or predetermined fuel or fuel component of less than or equal to 15 grams per square meter per day. The predetermined fuel component may be methanol or ethanol or fatty acid derivatives, such as used in fuels such as bio-fuels or flex-fuels. The predetermined fuel may be selected from fuels such as indolene, gasoline, biodiesel, diesel, alcohols, and alcohol-containing fuels without limitation. The other layers may be or include, without limit, a reinforcement such as a textile or wire, a different thermoplastic material including for example a TPE, a thermoset material such as a rubber or a crosslinked thermoplastic. Thus, embodiments of the invention include, without limitation, non-reinforced hose, for example, having two, three, or more layers; or reinforced hose having four, five, or more layers. FIG. 3 illustrates such a two-layer embodiment in the form of hose or tubing 140 comprising thin layer 142 of PA 6 and second layer 144 of other material such as rubber or plastic. FIG. 1 illustrates a five-layer embodiment as discussed earlier.

The resulting inventive hose according to one or more embodiments of the invention may advantageously be used, without limitation, for fuel tubing, fuel hose, fuel vapor hose, vent hose for fuel or oil, air conditioning hose, propane or LP hose, curb pump hose, large inside diameter filler neck hose or tubing, marine fuel hose, fuel injection hose, or the like, including diesel, bio-diesel, and other oil-like fuels or blends of any of the foregoing.

Hose embodiment for aggressive fuels at extreme conditions.

Surprisingly, it was discovered that the above presented embodiments were not sufficient for certain biofuels, in particular for the most aggressive biofuels, such as that designated B20. "B20" means a mixture of 20% bio-diesel and 80% petroleum-based diesel fuel. "B100" likewise means 100% bio-diesel, and so forth. It has been found that B20 is much more aggressive to fuel hose than B100, so that the targeted hot performance, such as target permeation rate, was not achieved by fuel hoses with ECO or NBR rubber formulations for the tube and/or cover materials. Such hoses had to be limited to use at temperatures of 100° C. or below. In particular, this applies to fuel injection hoses with high pressure and high temperature requirements.

Thus, there is a need for fuel line hoses which can handle higher temperatures, lower gasoline permeation, bio-fuel capability, and high pressure capability as compared to traditional fuel lines or even low permeation fuel lines. Traditional fuel lines (SAE J30R7) are low temperature, high gasoline permeation, low pressure, and have limited resistance to bio-fuels (particularly B20 at elevated temperatures). They are however, very cost competitive. Low permeation fuel lines (SAE J30R14—barrier type) address the gasoline permeation issue, but are low temperature, low pressure, with limited bio-fuel capability (typically NBR tube). They are moderately priced. Fuel Injection hoses (meeting SAE J30R9, SAE J30R12) are high temperature, low permeation, high pressure constructions that have full bio-fuel capability, but are very expensive because of the use of FKM materials.

Typical hose constructions use NBR (nitrile) tube materials, which are insufficient in several ways for this type of application. (1) Permeation resistance -Permeation rates are much higher than EPA/CARB allow (15 grams/square meter/day). In addition, bio-fuel will permeate through the tube layer to the hose surface. (2) Temperature resistance—NBR is sufficient only up to ~125° C. (257° F.)

Bio-Fuel Resistance—Bio-fuels can be very aggressive at B20 blends, particularly at elevated temperatures. NBR is degraded in these fluids at elevated temperatures.

Fuel Injection hoses typically utilize FKM tube materials, but FKM is extremely expensive. It has very good permeation resistance to both gasoline and bio-fuels. It is very resistant to gasoline and diesel fuel, including bio-fuel blends. It is not significantly degraded by B20 blends at elevated temperatures. It has temperature resistance up to 135° C. continuous, and 150° C. intermittent.

According to an embodiment of the invention, a five-layer hose construction was found to provide excellent performance as a fuel injection hose for biofuels such as B20 and other aggressive fuels at temperatures up to about 135° C. According to this embodiment, the layers of the hose from the inside out are: (1) a tube made of an HNBR rubber composition, (2) a barrier layer of the special nylon as described herein (as a preferred barrier, Technyl C548B), (3) a friction layer (i.e. elastomeric tie layer) also of HNBR rubber formulation (which may be the same as the tube), (4) a reinforcing layer (which may preferably comprise aramid fibers or yarns), and (5) a cover made of a rubber composition based on an elastomer blend of EVM and CPE (which may also be used as the friction layer instead of HNBR). The basic construction may thus be a five layer hose construction, consisting of an HNBR tube layer, a C548B plastic barrier layer, an HNBR friction layer, an aramid reinforcement layer, and an EVM/CPE blend cover layer. This combination gives excellent fuel resistance with the temperature and pressure resistance needed for these applications.

This hose construction largely meets the SAEJ30 specification, however it does not neatly fit into any of the current 14 classifications currently in that specification. As a result this hose is considered to be in the same spirit as low permeation specifications R9, R11, R12, and R14, however it will also encompass aspects of the currently proposed R13 biodiesel section.

This hose embodiment is intended to meet the demands of fuel injection systems and is useful in the transportation of gasoline, ethanol, methanol, ethanol extended gasoline, diesel fuel, Biodiesel including Soybean methyl ester (SME), Rapeseed methyl ester (RME), and Palm methyl ester (PME) that meets ASTM D6751, highly aromatic oils or paraffinic oils, as well as the fuel/oil vapor present in either the fuel systems or the crankcase of internal combustion engines. This hose is preferred for liquid fuels only, and is not intended for gaseous fuels such as propane, methane, or natural gas.

The HNBR tube is preferably a zinc-free elastomeric composition. The HNBR tube layer and the thermoplastic barrier layer are resistant to chemical attack, swelling, and permeation. This construction also includes an oil, semi-fuel, and ozone resistant outer cover based on a blend of EVM and CPE. Table 4 shows some typical useful dimensions for this hose embodiment.

HNBR (Hydrogenated nitrile) has a saturated polymer backbone, which gives excellent chemical resistance, and high temperature stability. HNBR is highly resistant to fuels (gasoline, diesel fuel and bio-diesel blends). Bio-fuels can be aggressive at certain blends (B20 particularly), especially at elevated temperatures. HNBR has demonstrated stability when aged in B20 blends at elevated temperatures (135° C.).

When combined with the C548B barrier layer, the hose construction, the gasoline permeation rate is extremely low (~1 gram/square meter/day per SAE J1737 at 40° C.), and permeation of bio-diesel on a 6-month equivalent test is not detectable. The entire hose construction is intended for use at elevated temperatures (135° C. continuous, 150° C. intermittent).

Material and performance testing was carried out on this fuel hose embodiment and its various components. All tests are to be conducted in accordance with ASTM D380, standard test methods for rubber hose unless otherwise specified. Table 5 shows a specification for material and performance testing of an HNBR tube compound useful in this embodiment. Table 6 shows a specification for material and performance testing of an EVM/CPE cover compound useful in this embodiment.

Additional specifications may be met by this hose embodiment, as follows. The minimum burst pressure for all sizes through 12.7mm (½" ID) may be 8.0 MPa (1160 psi). The maximum working pressure for all sizes through 12.7mm (½" ID) may be 1.55 MPa (225 psi). This hose may be suitable for use in normal continuous operating temperatures of −40 to 135° C. (−40 to 275° F.) with intermittent use up to 150° C. (302° F.). However, extended periods at 150° C. (302° F.) may significantly reduce hose life.

TABLE 4

Dimensions & Minimum Bend Radius:

| Hose Size | Inside Diameter | Outside Diameter | Minimum Bend Radius |
|---|---|---|---|
| 3/16" | 4.36 mm-5.16 mm (0.172"-0.203") | 9.74 mm-10.90 mm (0.384"-0.429") | 55 mm (2.16") |
| 5 mm | 4.60 mm-5.40 mm (0.181"-0.213") | 9.98 mm-11.14 mm (0.393"-0.439") | 57 mm (2.24") |
| ¼" | 5.95 mm-6.75 mm (0.234"-0.266") | 12.11 mm-13.27 mm (0.477"-0.525") | 65 mm (2.56") |
| 5/16" | 7.54 mm-8.34 mm (0.297"-0.328") | 13.70 mm-14.86 mm (0.539"-0.585") | 75 mm (2.95") |
| 3/8" | 9.13 mm-9.93 mm (0.359"-0.391") | 15.29 mm-16.45 mm (0.602"-0.647") | 85 mm (3.35") |
| ½" | 12.30 mm-13.10 mm (0.484"-0.516") | 19.05 mm-20.63 mm (0.750"-0.812") | 120 mm (4.72") |

TABLE 6

| Cover Characteristics | Original | After Aging 70 hr at 150° C. in ASTM IRM 903 Oil | After aging 168 hr at 150° C. Dry Heat | After aging 24 hr at 23° C. in Fuel B[6] |
|---|---|---|---|---|
| Ultimate Tensile | 8.28 MPa (1200 psi) min | 6.90 MPa (1000 psi) min Actual | 6.90 MPa (1000 psi) min Actual | — |
| Elongation at break | 175% min | 150% min actual | 100% min Actual | — |
| Shore A Hardness | 80 +/− 5 | — | — | — |
| Volume Swell (% change) | — | +75 max | — | +75 max |

[6]Reference Fuel B is comprised of 70% Iso-octane + 30% Toluene - per SAEJ30 December 2008 Appendix A.

The inventive hose may be subjected to an aging period of 1000 hours at 135° C. in dry air while bent to the minimum bend radius. After aging and within 6+/−2 seconds the hose may be brought to a straight position. The hose cover should show no cracking, charring, or disintegration. The hose may then be subjected to an air-under-water proof test at the maximum continuous working pressure specified for a period of 3 minutes and show no signs of leakage.

Fuel-aged cold flexibility may be tested as follows. Hose shall be filled with ASTM D471 Fuel C and conditioned for 70 hours at 23+/−1° C. hose shall then be drained and conditioned in a straight position for 5 hours at −40° C. after conditioning and within 10+/−2 seconds the hose shall be bent around a mandrel whose radius is equal to the minimum bend radius specified for the respective hose size and as a result may not break or crack. The hose may then be subjected to an air-under-water proof test at the maximum continuous working pressure specified for the respective hose size for a period of 3 minutes and may show no signs of leakage.

Rate of fuel permeation may be tested as follows. The fuel permeation using CE10 fuel should not exceed a maximum rate of 15 g/m² day when performed using the reservoir method discussed in SAE J30 (8 days @23° C.). Also, this hose typically meets and exceeds CARB requirements for small off-road engines and as such may display a certification number on the hose lay line. Reference Fuel CE10 is

TABLE 5

| Tube Characteristics | Original | After Aging 70 hr at 150° C. in ASTM IRM 903 Oil | After aging 168 hr at 23° C. in Fuel C[1] | After aging 168 hr at 23° C. in Fuel G[2] | After 168 hr at 150° C. in Bio-diesel[3] (SME) | After 168 hr at 135° C. in B20/D80[4] | After aging 168 hr at 135° C. Dry Heat | Oxidized Fuel[5] |
|---|---|---|---|---|---|---|---|---|
| Ultimate Tensile | 10.34 MPa (1500 psi) min | +/−50% Change | −45% change | 5.5 MPa (798 psi) min Actual | 6.90 MPa (1000 psi) min Actual | 6.90 MPa (1000 psi) min Actual | 6.90 MPa (1000 psi) min Actual | −35% change |
| Elongation at break | 200% min | +/−50% Change | −45% change | 150% min Actual | 150% min Actual | 150% min Actual | 150% min Actual | −40% change |
| Shore A Hardness | 70 ± 15 | +/−20 Points Change | — | — | — | — | — | — |
| Volume Swell (% change) | — | +20% Max | +50% max | +55% max | +30% max | +25% max | — | — |

[1]Reference Fuel C is comprised of 50% Iso-octane + 50% toluene - per SAEJ30 December 2008 Appendix A
[2]Reference Fuel G is comprised of 85% Fuel D (60% Iso-octane + 40% Toluene) + 15% anhydrous denatured ethanol - per SAEJ30 December 2008 Appendix A.
[3]Biodiesel: Soybean Methyl Ester that meets ASTM6751
[4]B20/D80 test fuel: 80% ASTM D975 Grade 2-D S15 Diesel with 20% ASTM 6751 Soybean methyl ester
[5]Oxidized fuel testing per SAEJ30R7 December 2008 section 6.18.

comprised of 80% Fuel C (50% Iso-octane+50% Toluene)+ 10% anhydrous denatured ethanol.

Vacuum resistance may be tested as follows. Hose may be subjected to a test vacuum for 15 to 30 seconds while in a straight position. The test vacuum may be 81 kPa for hose sizes 9.52 mm and smaller and 34 kPa for hoses size larger than 9.52 mm. The outside diameter of the hose may not be reduced by more than 20% at any time during the test.

Adhesion may be tested as follows. The load required to separate a 25.4 mm (1.0 in) width of any adjacent layers of the multi-layer construction should be greater than 35.6 N (8 lb).

Ozone Resistance may be tested as follows. Hose may be conditioned in an atmosphere with an ozone partial pressure of 100 mPA (100 parts of ozone per 100 million parts of air) at standard atmospheric conditions for 336 hours at 40° C. while bent to the minimum bend radius. At the conclusion of the test the hose cover should show no evidence of cracking or deterioration when viewed under 7× magnification while still in the stressed condition.

Extractables may be tested as follows. Using the method to determine extractable as outlined in SAE J30 the maximum total value should be 7.75 g/m².

Hoses constructed according to this embodiment passed the above-described tests and met the specifications described.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A fuel hose suitable for biofuel or alcohol-containing fuel comprising:
   an HNBR rubber inner tube;
   a rubber outer cover based on an elastomer blend consisting of EVM and CPE;
   an intermediate barrier layer consisting essentially of an impact-modified polyamide 6; and
   a textile reinforcement disposed between said barrier layer and said outer cover, wherein the radial thickness of the barrier layer is in the range of from 0.025 mm to 0.76 mm, wherein said polyamide 6 has a branched molecular structure, a flexural modulus of from 1 to 2 GPa, a tensile elongation at break of about 100% or more;
   wherein the hose has at least one of a permeability to gasoline of about 1 g/m²/day or less at 40° C. and a permeability to B20 biofuel of less than 1 g/m²/day at 40° when tested according to SAE J1737.

2. The fuel hose of claim 1 comprising only non-fluoropolymer-based layers.

3. The fuel hose of claim 1 wherein said barrier layer is a seamless, tubular layer.

4. The fuel hose of claim 1 further comprising an elastomeric tie layer between said barrier layer and at least one of said rubber tube and rubber cover layers.

5. The fuel hose of claim 1 wherein said polyamide 6 exhibits the following physical properties:
   Tensile modulus according to ISO 527 type 1A of about 1850/1000 MPa;
   Tensile strength at yield according to ISO 527 type 1A of about 55/45 MPa;
   Tensile strain at break according to ISO 527 type 1A of about 150/220%;
   Flexural modulus according to ISO 178 of about 1750/850 MPa;
   Flexural maximum stress according to ISO 178 of about 70/45 MPa; and
   Either Charpy notched impact strength according to ISO 179/1eA of about 92/NB kJ/m2, wherein NB signifies No Break, or
   Izod notched impact strength according to ISO 180/1A of about 90/NB kJ/m2, wherein NB signifies No Break;
   wherein if two values are listed, the first is for Dry As Molded material, and the second value is for material conditioned according ISO 1110.

6. A hose comprising:
   an HNBR rubber inner tube;
   a rubber outer cover based on an elastomer blend consisting of EVM and CPE;
   an intermediate barrier layer consisting essentially of an impact-modified polyamide 6; and
   a textile reinforcement disposed between said barrier layer and said outer cover, wherein the radial thickness of the barrier layer is in the range of from 0.025 mm to 0.76 mm, wherein said polyamide 6 has a branched molecular structure, a flexural modulus of from 1 to 2 GPa, a tensile elongation at break of about 100% or more;
   wherein the hose has at least one of a permeability to gasoline of about 1 g/m²/day or less at 40° C. and a permeability to B20 biofuel of less than 1 g/m²/day at 40° when tested according to SAE J1737.

7. The hose of claim 6 further comprising an HNBR rubber tie layer disposed between said barrier layer and said reinforcement.

8. The hose of claim 6 further comprising an EVM/CPE blend rubber tie layer between said barrier layer and said reinforcement.

9. A hose system comprising:
   at least one length of hose according to claim 6 and
   at least one fitting, clamp, or fluid-handling device.

10. The hose system of claim 9 wherein said polyamide 6 exhibits the physical properties, mechanical properties, and thermal properties:
   Water absorption according to ISO 62 tested 24 h at 23° C. of about 1.20%;
   Density according to ISO 1183-A of about 1.05 g/cc;
   Tensile modulus according to ISO 527 type 1A of about 1850/1000 MPa;
   Tensile strength at yield according to ISO 527 type 1A of about 55/45 MPa;
   Tensile strain at break according to ISO 527 type 1A of about 150/220%;
   Flexural modulus according to ISO 178 of about 1750/850 MPa;

Flexural maximum stress according to ISO 178 of about 70/45 MPa;
At least one impact property selected from: Charpy notched impact strength according to ISO 179/1eA of about 92/NB kJ/m2, wherein NB signifies No Break;
Charpy unnotched impact strength according to ISO 179/1eU NB/NB kJ/m2; and
Izod notched impact strength according to ISO 180/1A of about 90/NB kJ/m2;
Melting Temperature according to ISO 11357 of about 222° C.; and
Heat deflection temperature at 1.8 MPa according to ISO 75/Af of about 55° C.; wherein if two values are listed, the first is for Dry As Molded material, and the second value is for material conditioned according ISO 1110.

* * * * *